Figure 1:
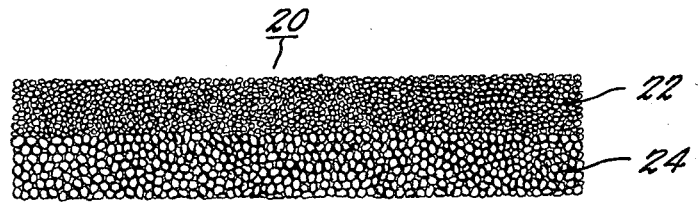

Dec. 30, 1941.   J. M. HILDABOLT   2,267,918
POROUS ARTICLE AND METHOD OF MAKING SAME
Filed March 27, 1940

INVENTOR
John M. Hildabolt
BY
Spencer Hardman & Feh
his ATTORNEYS

Patented Dec. 30, 1941

2,267,918

UNITED STATES PATENT OFFICE 2,267,918

POROUS ARTICLE AND METHOD OF MAKING SAME

John M. Hildabolt, Dayton, Ohio, assignor to General Motors Corporation, Detroit, Mich., a corporation of Delaware Application March 27, 1940, Serial No. 326,235

8 Claims. (Cl. 29—189)

This invention relates to porous metal elements and methods of making the same and is particularly concerned with porous metal elements wherein the porosity varies through the cross section thereof.

An object of the invention is to provide a porous metal article which includes at least two strata therein having different degrees of porosity.

In carrying out the above object it is a further object to provide a method for making such an article wherein at least two noncompacted layers of varying grain size metal powders, one superimposed upon the other, are sintered for forming a strong porous sheet of material wherein the porosity at one side thereof is different than the porosity at the other side thereof.

In carrying out the above object it is apparent that it is a further object to provide a method which may be employed for making articles having a plurality of strata of varying porosities.

Another object of the invention is to provide porous metal articles which can be used as filter elements where one side of the article has a low degree of porosity and the other side of the article has a high degree of porosity, thus providing a cleanable filter wherein the flow therethrough may be reversed from the high porosity side to the low porosity side for removing precipitated matter upon the low porosity side.

Another object of the invention is to carry out the method heretofore defined wherein the porous layer may be bonded to a steel member or the like which may subsequently be used in the manufacture of bearings or similar articles or wherein the steel member may be perforated to function as a reenforcing element for the porous material.

In carrying out the above objects it is another object in some cases to cause the porous metal to completely fill the apertures in the reenforcing element.

Still another object is to provide a supporting element which has apertures therethrough of sufficiently small size to prevent the powdered metal layer which is placed thereon from passing through the apertures whereby a second layer of powdered metal of considerably smaller grain size may be superimposed upon the first layer of metal powder and the entire assembly can then be sintered to effect a bond between the porous metal and the supporting element and cause the powdered metal to sinter together to form a porous layer of varying porosities through the cross section thereof. In this case a metal screen may be used, such screen being formed from any one of the conventional materials such as copper, iron, nickel, or any other metal which is suitable for use with the particular metal powder which forms the porous metal layer.

Figure 2:
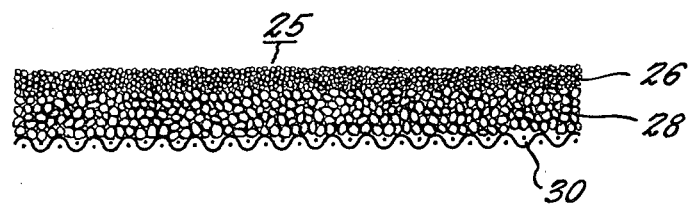

In the drawing:

Fig. 1 is a fragmentary view showing a filter having two layers of different porosity and Fig. 2 is a filter having two layers of different porosity bonded to and supported by a metallic screen.

Material having a high degree of porosity which may be used for filters and the like has been disclosed in Patent No. 2,157,596 to Davis, which is assigned to the assignee of this invention. In filter material having a substantially uniform porosity throughout, it has been necessary to replace the filter element after the same has become fouled by precipitated matter strained out from the fluid passed therethrough. This condition arises through the use of a porous material wherein the porosity is substantially uniform throughout the cross section of the material. Filters of this type are so highly successful due to their strength and metallic character that there has been an increasing demand for a filter which is readily cleanable. The present invention is particularly directed to a cleanable type of filter element 20 where after precipitated matter has fouled the filter, the flow therethrough may be reversed to clean the filter and place it in condition for subsequent use. In order to accomplish this, I propose to make a filter element 20 having varying degrees of porosity through the cross section thereof. In this manner if fluids are flowed through the filter 20 from the side thereof which comprises a layer 22 of relatively low porosity, to the side thereof which comprises a layer 24 of high porosity, it is possible to collect the precipitated matter adjacent the surface of the low porosity side and, by the simple expedient of the reversal of fluid flow through the filter, this matter may be flowed off the surface of the filter and out of the pores thereof at the low porosity side. The high porosity part 24 of the filter acts not only as a supporting member but likewise permits a considerably thinner layer 22 of low porosity metal to be present.

In making a filter of this character I propose to distribute metal powder having a substantially uniform grain size upon a supporting surface, such as a graphite plate, which is non-adhering to the metal powder and then superimpose a second layer of metal powder having a different grain size upon the first layer. The metal powder and the plate of graphite are then placed in the sintering furnace and heated under non-oxidizing conditions for a sufficient time and at a temperature conducive to sintering so that the metal particles bond together to form a strong porous element having two or more strata of different porosities. After cooling, the porous element in the sheetlike form may be removed from its supporting plate of graphite. The element may be made from any of the conventional metal powders such as copper-tin mixtures, copper-nickel mixtures and iron-copper mixtures, bronze powders and in fact any type of metal powder or powders which when sintered under the optimum condition, form the desired porous metal layer.

An example given for illustrative purposes only contemplates the use of a mixture of 90% copper and 10% tin powder of a grain size of about 200 mesh. These powders are distributed upon a plate of graphite and then copper-tin powder in the same relative proportions, having a grain size of 80 mesh is distributed upon the layer of 200 mesh powder. The graphite plate with the superimposed layers of copper and tin powder is then placed in a sintering furnace and heated under non-oxidizing conditions to a temperature varying from 1500° F. to 1800° F. for a period of from 10 to 20 minutes whereupon the tin and copper alloy form a bronze and the particles of bronze are bonded together in a sheetlike form wherein the layer adjacent the supporting surface is of a low degree of porosity and the superimposed layer which is bonded thereto of 80 mesh powder has a high degree of porosity.

I prefer to use powders having constituent rich surfaces thereon when utilizing large grain sizes. However, this is not necessary to the success of the invention but facilitates the execution thereof. These powders may be obtained wherein each particle has a constituent rich surface thereon. For example, copper particles having a thin layer of tin either mechanically held thereto or pre-alloyed therewith whereby the tin is metallurgically associated with the copper. Likewise, the bronze particles of the powder may be utilized wherein the degree of alloying of the constituents may or may not be complete throughout the particles.

It is further apparent in some instances that more than two layers of particles of varying grain sizes may be desired. Filters having three, four or even more layers may be made by the method disclosed, by the superimposing of the layers having different grain sizes one on the other.

It may be desirable in the manufacture of bearings and the like as disclosed in Patent No. 2,198,253 assigned to the assignee of the present invention to provide a matrix bonded to a steel back, which matrix has a varying porosity therethrough. Obviously, the method disclosed in Patent No. 2,198,253, will not be changed in order to utilize the invention disclosed herein, with the exception that a second layer of powder must be superimposed upon the powder already placed on the steel back.

In some cases, it may be desirable to bond a plurality of porous metal layers 26 and 28 to a supporting or reenforcing element, such as, a steel plate which is perforated, or to a screen 30. When a screen 30 is used it may be of such a mesh size that the first layer of powder placed thereon will not pass therethrough, or it may be of a larger mesh and be placed upon a graphite supporting surface prior to the distribution of powder thereon, in which case, the metal powder will fill the mesh of the screen 30. This condition is also possible when using an apertured or perforated metal plate.

In all of the embodiments herein disclosed the thickness of the various layers of metal powder is a matter of choice although I prefer to provide layers little more than one particle thick. This, of course, is difficult to determine when using a very fine mesh size powder. However, the thickness of the layer is not to be considered a limiting factor since varying depth layers may be used for different applications and the exact depth of the layer may be best determined by experiment.

While the embodiments of the present invention as herein disclosed, constitute preferred forms, it is to be understood that other forms might be adopted, all coming within the scope of the claims which follow.

What is claimed is as follows:

1. A filter element comprising a homogeneous sheet of porous metal consisting of at least two strata having different degrees of porosity, said element being made from sintered, non-compacted powders.

2. A filter element comprising a homogeneous sheet of porous metal made from sintered, non-compacted metal powders and consisting of a plurality of layers having different degrees of porosity.

3. A composite element comprising a homogeneous porous metal sheet made by sintering together non-compacted metal powders and bonded to a dense metal supporting surface consisting of a layer of high porosity metal bonded to a layer of relatively less porosity metal, said layers of porous metal being bonded to a dense metal supporting surface.

4. A composite article comprising a porous metal sheet having different degrees of porosity at either side thereof and consisting of sintered non-compacted metal powder, comprising a substantially flat sheet of porous metal having a predetermined varying degree of porosity through any cross section thereof, said sheet consisting of a plurality of layers of different porosities.

5. A method of making composite sheet material wherein the porosity at one side of the sheet is less than at the other side thereof comprising the steps of, depositing a layer of metal powder of substantially uniform grain size upon a non-adhering supporting surface, depositing another layer of metal powder of different grain size upon said first layer, and then sintering the layers of metal powders under non-oxidizing conditions upon said supporting surface for a time sufficient to cause the metal particles to sinter together and form a strong, highly porous sheet having layers of different porosity and then removing the sheet from the supporting surface.

6. In the method of making highly porous metal sheet material wherein the porosity through a cross section of the sheet is varied comprising the steps of distributing a layer of substantially uniform grain size metal powder in a loose non-compacted condition upon a non-adhering supporting surface distributing a second layer of metal powder having a grain size different than that of the first layer upon said first layer in a non-compacted condition, and then heating the supporting surface with the metal powder thereon under non-oxidizing conditions at a temperature and for a time sufficient to cause the metal powder particles to sinter together and form a highly porous sheet having different degrees of porosity throughout the cross section thereof, and then removing the sheet from the supporting surface.

7. A method of making a composite metal element including a porous metal layer wherein the porosity of the porous metal layer varies through the cross section thereof comprising the steps of distributing loose non-compacted metal powder of substantially uniform grain size upon a supporting surface, distributing additional metal powder in a loose non-compacted condition upon said first layer, said additional powder being of a different grain size than the grain size of the powder in the first layer, then heating the supporting surface with the metal powder thereon under non-oxidizing conditions at a temperature and for a time sufficient to cause the metal particles to sinter together into a strong porous metal layer.

8. The method as defined in claim 7, where the porous metal layer is bonded to the supporting surface after the sintering step has been concluded.

JOHN M. HILDABOLT.